United States Patent
Ando

(10) Patent No.: US 10,007,514 B2
(45) Date of Patent: Jun. 26, 2018

(54) MANAGEMENT APPARATUS, MANAGEMENT SYSTEM, MANAGEMENT METHOD, AND NON-TRANSITORY COMPUTER READABLE MEDIUM

(71) Applicant: FUJI XEROX CO., LTD., Tokyo (JP)

(72) Inventor: Toshiaki Ando, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 16 days.

(21) Appl. No.: 15/203,053

(22) Filed: Jul. 6, 2016

(65) Prior Publication Data
US 2017/0192774 A1    Jul. 6, 2017

(30) Foreign Application Priority Data
Jan. 4, 2016    (JP) ................................ 2016-000197

(51) Int. Cl.
G06F 9/44    (2018.01)
(52) U.S. Cl.
CPC . *G06F 8/71* (2013.01); *G06F 8/77* (2013.01)
(58) Field of Classification Search
CPC ..................................... G06F 8/71; G06F 8/77
USPC ................. 717/101–103, 120–123, 126
See application file for complete search history.

(56) References Cited

U.S. PATENT DOCUMENTS 6,748,115 B1 *  6/2004  Gross ....................... G06T 9/00
                                                    382/218
2014/0368887 A1  12/2014  Segawa et al.

FOREIGN PATENT DOCUMENTS

| JP | 2009-042818 A | 2/2009 |
| JP | 2012-174196 A | 9/2012 |
| JP | 2013-250911 A | 12/2013 |
| JP | 2015-001809 A | 1/2015 |

OTHER PUBLICATIONS

Cisco, White Paper, "Researching in Service Software Upgrade Compatibility", Aug. 2007, Cisco Systems, Inc., 4 pages.*
Andy Maloney, "Comparing Nearly Identical Images Using Beyond Compare", 2013, Journal of Forensic Identification, pp. 153-164.*

* cited by examiner

*Primary Examiner* — Ted T Vo
(74) *Attorney, Agent, or Firm* — Oliff PLC

(57) ABSTRACT

A management apparatus is provided with an acquisition unit and a management unit. The acquisition unit acquires a verification image and a reference image. The verification image is generated from predetermined image data by a software for verification. The reference image is generated from the predetermined image data by a software having a verification result indicating compatibility. The management unit manages a verification result indicating that the software for verification has compatibility in a case where a difference between the verification image and the reference image falls within an acceptable range and indicating that the software for verification has no compatibility in a case where the difference does not fall within the acceptable range.

11 Claims, 11 Drawing Sheets

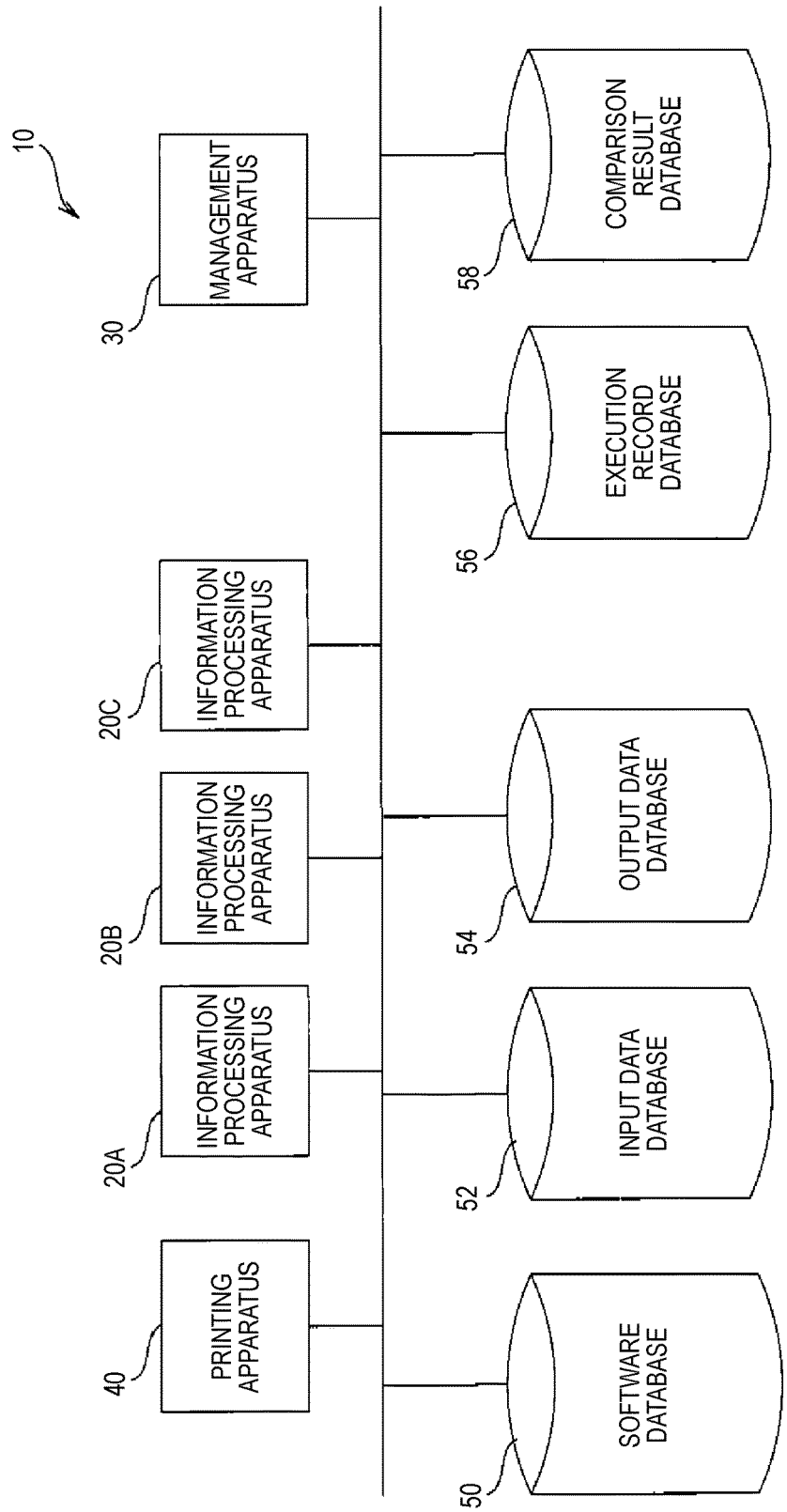

| SOFT-WARE ID | SOFTWARE NAME | VERSION | APPARATUS NAME | SETTING INFORMATION | EXECUTION SCRIPT | OUTPUT DESTINATION |
|---|---|---|---|---|---|---|
| 0001 | Print-X | 5.0 | Host-A | SETTING A | ScriptA | ... |
| 0002 | Print-X | 5.1 | Host-A | SETTING B | ScriptA | ... |
| 0003 | Print-X | 3.0 | Host-B | SETTING A | ScriptB | ... |
| 0004 | Print-X | 5.0 | Host-C | SETTING A | ScriptB | ... |
| ... | ... | ... | ... | ... | ... | ... |

| INPUT DATA ID | TEMPLATE NAME | TEMPLATE NAME |
|---|---|---|
| 1001 | REQUEST A | FOR FEBRUARY 2015 |
| 1002 | DETAILS A | FOR FEBRUARY 2015 |
| 1003 | REQUEST A | FOR MARCH 2015 |
| 1004 | DETAILS A | FOR MARCH 2015 |
| 1005 | REQUEST A | FOR APRIL 2015 |
| 1006 | DETAILS A | FOR APRIL 2015 |
| ... | ... | ... |

FIG. 4

| OUTPUT DATA ID | OUTPUT DATA NAME | FILE TYPE |
|---|---|---|
| 2001 | REQUEST A-FOR FEBRUARY 2015-01 | PDF |
| 2002 | DETAILS A-FOR FEBRUARY 2015-01 | PDF |
| 2003 | REQUEST A-FOR MARCH 2015-01 | PDF |
| 2004 | DETAILS A-FOR MARCH 2015-01 | PDF |
| 2005 | REQUEST A-FOR FEBRUARY 2015-02 | PDF |
| 2006 | DETAILS A-FOR FEBRUARY 2015-02 | PDF |
| ... | ... | ... |

FIG. 5

| IDENTIFIER | SOFTWARE ID | INPUT DATA ID | OUTPUT DATA ID | EXECUTION DATE AND TIME |
|---|---|---|---|---|
| 3001 | 0001 | 1001 | 2001 | 2015/2/24 |
| 3002 | 0001 | 1002 | 2002 | 2015/2/28 |
| 3003 | 0001 | 1003 | 2003 | 2015/3/24 |
| 3004 | 0001 | 1004 | 2004 | 2015/3/30 |
| 3005 | 0002 | 1001 | 2005 | 2015/3/05 |
| 3006 | 0002 | 1002 | 2006 | 2015/3/08 |
| ... | ... | ... | ... | ... |

| REFERENCE DATA ID | VERIFICATION DATA ID | VERIFICATION RESULT |
|---|---|---|
| 3001 | 3005 | COMPATIBILITY |
| 3002 | 3006 | NON-COMPATIBILITY |
| ... | ... | ... |

MANAGEMENT APPARATUS, MANAGEMENT SYSTEM, MANAGEMENT METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-000197 filed on Jan. 4, 2016.

BACKGROUND

Technical Field

The present invention relates to a management apparatus, a management system, a management method, and a non-transitory computer readable medium.

SUMMARY

According to an aspect of the invention, a management apparatus is provided with an acquisition unit and a management unit. The acquisition unit acquires a verification image and a reference image. The verification image is generated from predetermined image data by a software for verification. The reference image is generated from the predetermined image data by a software having a verification result indicating compatibility. The management unit manages a verification result indicating that the software for verification has compatibility in a case where a difference between the verification image and the reference image falls within an acceptable range and indicating that the software for verification has no compatibility in a case where the difference does not fall within the acceptable range.

BRIEF DESCRIPTION OF THE DRAWINGS

Exemplary embodiment(s) of the present invention will be described in detail based on the following figures, wherein FIG. 1 is a block diagram showing the overall configuration of a management system according to an exemplary embodiment;

FIG. 2 is a schematic diagram showing an example of software management information according to the exemplary embodiment;

FIG. 3 is a schematic diagram showing an example of input data management information according to the exemplary embodiment;

FIG. 4 is a schematic diagram showing an example of output data management information according to the exemplary embodiment;

FIG. 5 is a schematic diagram showing an example of execution record management information according to the exemplary embodiment;

DETAILED DESCRIPTION

Figures 6, 7:
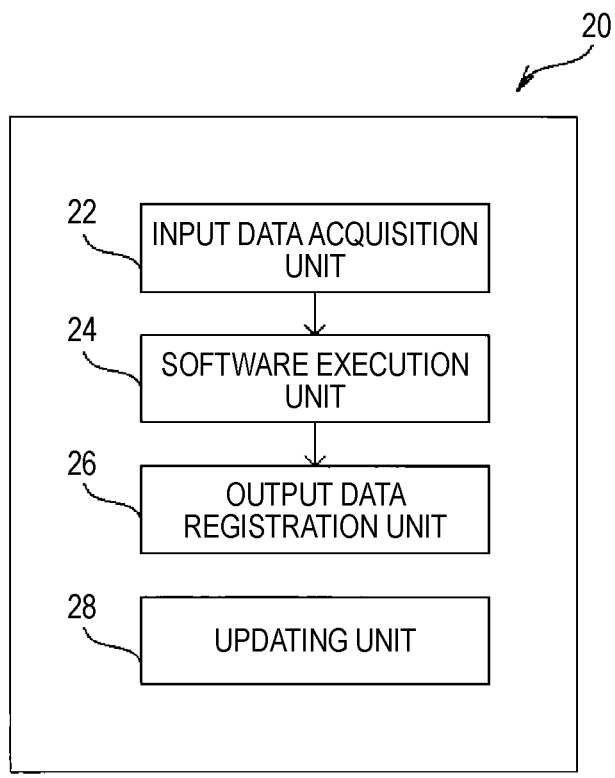
FIG. 6 is a schematic diagram showing an example of comparison result information according to the exemplary embodiment.
FIG. 7 is a block diagram showing a functional configuration of an information processing apparatus according to the exemplary embodiment.

Hereinafter, a management system according to exemplary embodiment(s) will be described with reference to the accompanying drawings.

First, the overall configuration of a management system according to exemplary embodiment(s) will be described.

As shown in FIG. 1, a management system 10 according to the exemplary embodiment includes plural (three in this exemplary embodiment) information processing apparatuses 20A to 20C (hereinafter, referred to as an information processing apparatus 20 in a case where it is not necessary to distinguish the individual information processing apparatuses from each other) which execute software. In addition, the management system 10 includes a management apparatus 30. In addition, the management system 10 includes a printing apparatus 40. In addition, the management system 10 includes a software database 50, an input data database 52, an output data database 54, an execution record database 56, and a comparison result database 58.

The information processing apparatus 20, the management apparatus 30, the printing apparatus 40, the software database 50, the input data database 52, the output data database 54, the execution record database 56, and the comparison result database 58 are electrically connected to each other to communicate with each other.

The information processing apparatus 20 independently operates plural pieces of software for image formation. At this time, the plural pieces of software for image formation are operated while being switched or are operated in parallel. In addition, the information processing apparatus 20 independently operates plural versions of software of the same pieces of software for image formation. That is, in the management system 10, different versions of software for image formation can be operated by one information processing apparatus 20, or the same pieces of software for image formation can be operated by the plural information processing apparatuses 20.

In addition, the information processing apparatus 20 at least one of software having a verification result indicating compatibility (hereinafter, also referred to as "software for reference") and software to be verified (hereinafter, also referred to as "software for verification") is stored in a storage unit 12d to be described later. In addition, the information processing apparatus 20 having the software for reference stored therein stores output data, obtained by inputting input data indicating an image which is determined in advance as an object to be formed, in the output data database 54 by the software for reference. In addition, the information processing apparatus 20 having the software for verification stored therein stores output data, obtained by inputting the input data, in the output data database 54 by the software for verification.

The wording "software for verification" as used herein refers to software which is a target for the verification of compatibility. In this exemplary embodiment, a description will be given of a case where an updated version of software of software used for work is used.

In addition, the wording "software for reference" as used herein refers to software that generates a reference image at the time of performing verification on a verification image, the software being software of which the normal operation is verified. In this exemplary embodiment, a description will be given of a case where software, which is already used for work, is used as software for reference.

In addition, the term "compatibility" as used herein refers to compatibility with respect to software for reference having a verification result indicating compatibility. The verification of compatibility has a verification result indicating compatibility at the time of generating an image on the basis of predetermined image data by software for verification, and is performed in order to confirm whether or not the same image as an image generated by software for reference, which is already used for work, is generated.

For example, in work, when a user forms an image using a document template and variable data by software for image formation by means of the information processing apparatus 20, software for reference is used. At this time, the information processing apparatus 20 stores image data of the image generated by the software for reference in the output data database 54 as output data. Thereby, a reference image is stored in the output data database 54 without making a user conscious of the storage during the work. Meanwhile, output data which is output by software for image formation in the information processing apparatus 20 is image data which is described in, for example, a page description language (PDL) in a case where variable printing is performed.

In addition, the information processing apparatus 20 includes an execution environment in which an updated version of software is executed independently of software for work. In addition, in a case where the version of software used for work is updated, the information processing apparatus 20 switches between the software for work and the updated version of software. Thereby, the information processing apparatus 20 performs image formation in the same manner as work using the same input data as in a case where work is performed, by the updated version of software. As a result, output data generated by the updated version of software in the same conditions as those in a case of being created by the software for work is obtained. An image shown in the output data is set to be a verification image, thereby generating the verification image.

The management apparatus 30 acquires a verification image which is generated from predetermined image data by software for verification, by the information processing apparatus 20 having the software for verification stored therein. In addition, the management apparatus 30 acquires the image generated from the image data determined in advance by the software for reference, as a reference image which is used as a comparison target during verification.

In addition, the management apparatus 30 compares the verification image and the reference image with each other, and prompts the information processing apparatus 20 to update software for work to an updated version of software in a case where the updated version of software is determined to have compatibility on the basis of the comparison result. Meanwhile, the management apparatus 30 performs management in both a case where the software for verification and the software for reference are operated by the same information processing apparatus and a case where the software for verification and the software for reference are operated by different information processing apparatuses.

The software database 50 is a database in which information regarding software executed by the information processing apparatus 20 is stored. As an example, as shown in FIG. 2, a software ID, a software name, a version, an apparatus name, setting information, an execution script, and an output destination are stored in the software database 50 in association with each piece of software. The setting information is information including at least one of information indicating a font list used for image formation, information indicating the resolution of an image to be formed, and information indicating whether an image to be formed is a monochromatic image or a color image, as an image formation condition. Meanwhile, the setting information is information which is individually set for each piece of software by each of the information processing apparatuses 20.

The input data database 52 is a database in which the above-mentioned input data, which is input to the information processing apparatus 20 in order to be executed by software for verification or software for reference, is stored. As an example, as shown in FIG. 3, an input data ID, a template name, and a variable data name are stored in the input data database 52 for each piece of input data in association with each other.

The output data database 54 is a database in which output data, which is generated on the basis of input data by the execution of software for verification or software for reference in the information processing apparatus 20 and is output, is stored. As an example, as shown in FIG. 4, an output data ID, an output data name, and a file type are stored in the output data database 54 in association with each piece of output data.

The execution record database 56 is a database in which execution records of software for verification or software for reference in the information processing apparatus 20 are stored. As an example, as shown in FIG. 5, an identifier, a software ID, an input data ID, an output data ID, and an execution date and time are stored in the execution record database 56 in association with each other.

The comparison result database 58 is a database in which a result of comparison between a verification image and a reference image is stored. As an example, as shown in FIG. 6, a reference data ID which is an output data ID of a reference image, a verification data ID which is an output data ID of a verification image, and a verification result are stored in the comparison result database 58 in association with each other. In this exemplary embodiment, as shown in FIG. 6, as a verification result, information indicating "compatibility" is stored in a case where a reference image and a verification image conform to each other, and information indicating "non-compatibility" is stored in a case where both the images do not conform to each other.

On the other hand, as shown in FIG. 7, the information processing apparatus 20 includes an input data acquisition unit 22, a software execution unit 24, an output data registration unit 26, and an updating unit 28.

The input data acquisition unit 22 acquires software to be executed from the software database 50, and acquires input data which is used for the execution of the software from the input data database 52.

The software execution unit 24 executes software using input data which is acquired by the input data acquisition unit 22, and outputs output data to the output data registration unit 26.

After software is executed by the software execution unit 24, the output data registration unit 26 registers output data which is output on the basis of the execution of the software. At this time, the output data registration unit 26 stores an image shown by output data which is output by software for reference or an image shown by output data which is output by software for verification in the output data database 54 to thereby register the image. Meanwhile, at this time, the image shown by output data which is output by software for reference and the image shown by output data which is output by software for verification are stored in the output data database 54 without being distinguished from each other.

In addition, after software is executed by the software execution unit 24, the output data registration unit 26 stores execution records at that time in the execution record database 56 to thereby register the execution records.

The updating unit 28 determines whether or not there is software determined to be compatible with software for reference, out of newly installed software and an updated version of software installed. In addition, in a case where there is newly installed software determined to be compatible with software which has been verified, the updating unit 28 operates the software newly installed as software for work. In addition, in a case where there is an updated version of software determined to be compatible with the software for reference, the updating unit 28 updates the existing software to the updated version of software.

Figure 8:
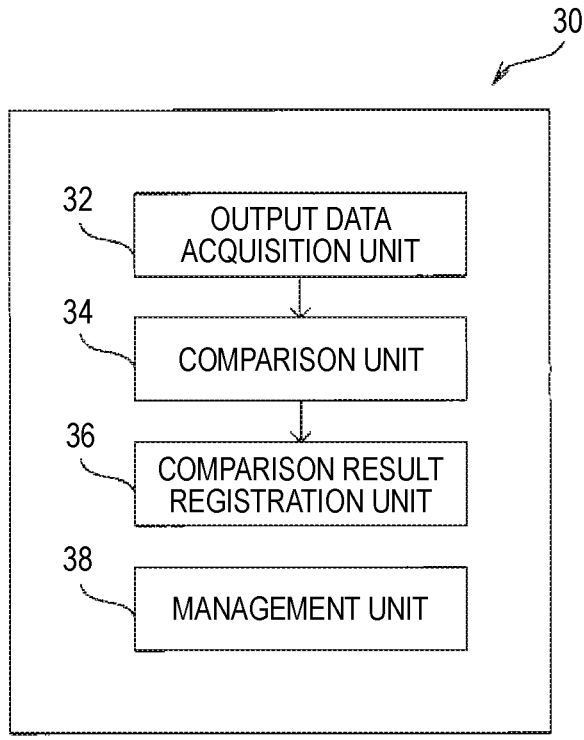
FIG. 8 is a block diagram showing a functional configuration of a management apparatus according to the exemplary embodiment.

In addition, as shown in FIG. 8, the management apparatus 30 includes an output data acquisition unit 32, a comparison unit 34, a comparison result registration unit 36, and a management unit 38.

The output data acquisition unit 32 acquires output data of a reference image and output data of a verification image from the output data database 54, on the basis of execution records stored in the execution record database 56.

The comparison unit 34 compares a verification image with a reference image, and stores a comparison result in the comparison result database 58. At this time, for example, the comparison unit 34 generates verification results in which software for verification is set to have compatibility in a case where a difference between the verification image and the reference image falls within an acceptable range, and the software for verification is set not to have compatibility in a case where the difference does not fall within the acceptable range. Meanwhile, in a case where a file format of output data is different for each piece of software for verification, comparison is performed using a comparison method according to the file format. For example, in a case where software for verification is software for image formation and output data is image data which is described in, for example, the above-mentioned PDL, the image data is converted into a bitmap image and is compared.

The comparison result registration unit 36 stores a result of comparison between a verification image and a reference image which is generated by the comparison unit 34, in the comparison result database 58.

The management unit 38 transmits updating instruction information for prompting updating to an updated version of software determined to be compatible with the existing version of software among updated versions of software installed in the information processing apparatus 20, to the information processing apparatus 20. Meanwhile, the updating instruction information also includes information for prompting software determined to be compatible with the existing software, among pieces of software that are newly installed in the information processing apparatus 20, to be used as software for work.

Figure 9:
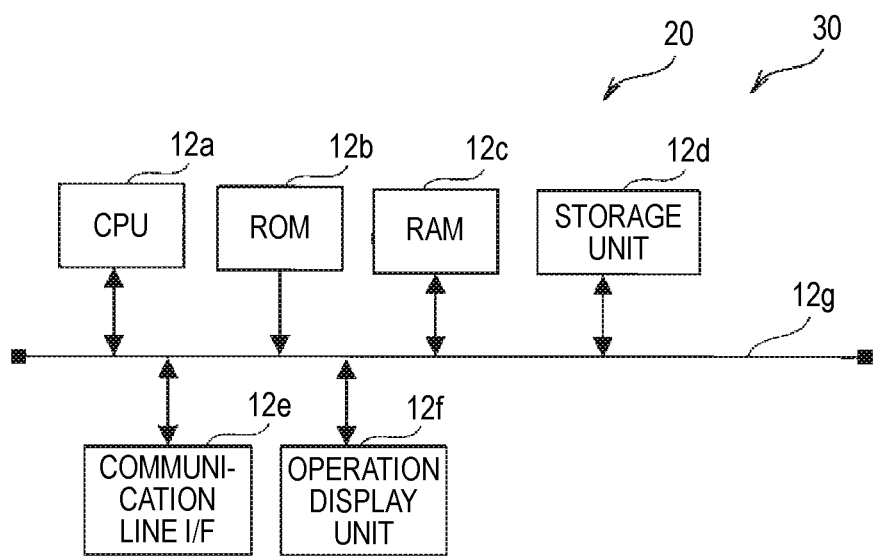
FIG. 9 is a block diagram showing an electric configuration of the management apparatus according to the exemplary embodiment.

Meanwhile, as shown in FIG. 9, the information processing apparatus 20 and the management apparatus 30 are realized by being controlled by a central processing unit (CPU) 12a that manages the operation of the overall apparatus. That is, the information processing apparatus 20 and the management apparatus 30 includes the CPU 12a, a read only memory (ROM) 12b in which various programs, various parameters, and the like are stored in advance, a random access memory (RAM) 12c which is used as a work area or the like during the execution of various programs by the CPU 12a, and a storage unit 12d that includes a non-volatile memory such as a flash memory. In addition, the information processing apparatus 20 and the management apparatus 30 include a communication line interface (I/F) unit 12e that transmits and receives communication information to and from an external device. In addition, the information processing apparatus 20 and the management apparatus 30 include an operation display unit 12f that receives a user's instruction and displays various pieces of information. Meanwhile, the operation display unit 12f includes, for example, a display button that realizes the reception of an operation instruction by the execution of a program, a touch panel type display on which various pieces of information are displayed, and hardware keys such as numeric keys and a start button.

Figure 10:
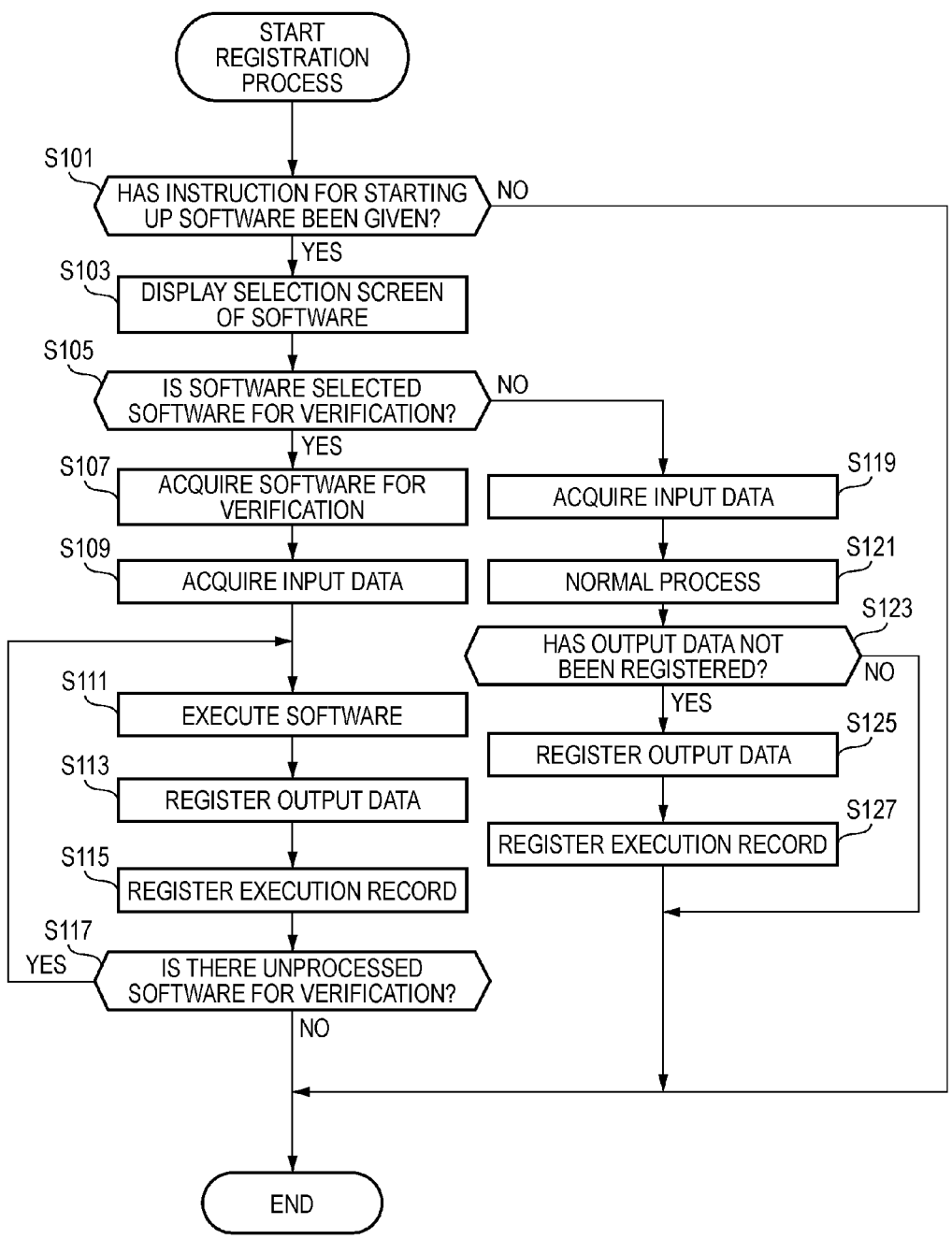
FIG. 10 is a flow chart showing a flow of a registration process according to the exemplary embodiment.

Next, reference will be made to a flow chart shown in FIG. 10 to describe a flow of processing at the time of performing a registration process of registering an image formed, when an image is formed by executing software for image formation which is executed by the information processing apparatus 20 according to this exemplary embodiment.

Meanwhile, in this exemplary embodiment, a program of a registration process is stored in the storage unit 12d of the information processing apparatus 20 in advance, but the invention is not limited thereto. For example, the program of the registration process may be received from an external device through the communication line I/F unit 12e of the information processing apparatus 20 and may be executed. In addition, the program of the registration process which is recorded in a recording medium such as a CD-ROM may be read by a CD-ROM drive or the like, thereby executing the registration process.

In this exemplary embodiment, a program of a registration process is executed every time a fixed period of time (for example, 0.1 seconds) elapses while the information processing apparatus 20 is operating. However, an execution timing is not limited thereto, and the execution may be performed in a case where an instruction for execution is input by the operation display unit 12f. For example, the execution may be performed at a timing when new software is installed in the information processing apparatus 20 or at a timing when a new version of software of the existing software is installed in the information processing apparatus 20.

In step S101, the input data acquisition unit 22 determines whether or not an instruction for starting up software is input by, for example, an operation instruction of the operation display unit 12f.

In step S103, the input data acquisition unit 22 displays a selection screen for selecting software to be executed on the operation display unit 12f of the information processing apparatus 20. In this exemplary embodiment, software for reference which is used for work and software for verification which is used for verification are displayed on a selection screen as software to be executed. A user confirms the selection screen to select software for reference, for example, in a case where normal work is performed and to select software for verification in a case where the verification of software newly installed in the information processing apparatus 20 is performed.

In step S105, the input data acquisition unit 22 determines whether or not the selected software is software for verification. In a case where it is determined that the software selected in step S105 is software for verification (S105, Y), the flow proceeds to step S107. In addition, in a case where it is determined in step S105 that the software is not software for verification, that is, in a case where it is determined that the software is software for reference (S105, N), the flow proceeds to step S119.

In step S107, the input data acquisition unit 22 acquires software for verification from the software database 50. In this exemplary embodiment, a list of pieces of software for verification is displayed on the operation display unit 12f so that a user selects software to be executed, thereby acquiring software for verification using a software ID of the selected software. However, a method of selecting software for verification is not limited thereto. For example, information indicating whether each of the pieces of software for verification has been verified is stored in the storage unit 12d, and software for verification which has not been verified may be acquired. Alternatively, information indicating whether or not each of the pieces of software for verification has a verifiable reference image may be stored in the storage unit 12d, and software for verification which corresponds to a verifiable reference image may be preferentially acquired by the information processing apparatus 20.

In step S109, the input data acquisition unit 22 acquires input data from the input data database 52. At this time, the input data acquisition unit 22 acquires a document template and variable data that are required for the execution of software for verification. In this exemplary embodiment, a list of pieces of input data is displayed on the operation display unit 12f so that a user selects input data to be executed, thereby acquiring input data using an input data ID of the selected input data. However, a method of acquiring input data is not limited thereto. Information indicating whether or not each of the pieces of input data has a verifiable reference image may be stored in the storage unit 12d, and input data corresponding to a verifiable reference image may be acquired by the information processing apparatus 20.

For example, execution records "3003" and "3004" shown in FIG. 5 are execution records when output data is output using pieces of input data having input data IDs "1003" and "1004" by software having a software ID "0001". That is, it is possible to compare the output data which is output using the input data having the input data IDs "1003" and "1004" by software having a software ID "0002" with execution results of execution records "3003" and "3004". In this case, the software having the software ID "0002" may be selected as software for verification, and the input data having the input data IDs "1003" and "1004" may be selected.

In step S111, the software execution unit 24 executes the acquired software for verification, and generates output data from the acquired input data, as an execution result. At this time, the software execution unit 24 transmits input data to the software for verification and generates a file name of the output data, thereby executing software on the basis of predetermined setting information and a predetermined execution script. For example, the software execution unit 24 generates image data on the basis of the acquired document template and variable data by the software for verification, and sets the generated image data to be output data.

In step S113, the output data registration unit 26 stores the generated output data in the output data database 54 to thereby register the generated output data. In this exemplary embodiment, as shown in FIG. 4, the output data registration unit 26 attaches an output data ID to the generated output data as an identification ID, and attaches an output data name corresponding to input data used for the generation of output data. In addition, the output data registration unit stores the output data ID, the output data name, and the file type, which are associated with each other, in the output data database 54.

In step S115, the output data registration unit 26 stores execution records of software for verification in the execution record database 56 to thereby register the execution records. In this exemplary embodiment, as shown in FIG. 5, the output data registration unit 26 attaches an identifier to this execution process, and stores a software ID of software used for execution, an input data ID, an output data ID, and an execution date and time, which are associated with each other, in the execution record database 56. In the example shown in FIG. 5, an execution record "3001" is a result in which an output data ID "2001" is obtained by inputting an input data ID "1001" to a software ID "0001". Meanwhile, as shown in FIG. 2, software having the software ID "0001" is software having a software name "Print-X", a version "5.0", and an information processing apparatus "Host-A" to be executed. In addition, input data of the input data ID "1001" is input data having a template name "request A" and a variable data name "for February 2015". In addition, output data having an output data ID "2001" is output data having an output data name "request A-for February 2015-01".

In step S117, the input data acquisition unit 22 determines whether or not there is unprocessed software for verification, which has not been subjected to the processes of steps S111 to S115, among the acquired pieces of software for verification. In a case where it is determined in step S117 that there is unprocessed software for verification (S117, Y), the flow proceeds to step S111 to perform the processes of steps S111 to S115 on the unprocessed software for verification. In addition, in a case where it is determined in step S117 that there is no unprocessed software for verification (S117, N), the execution of the program of this registration process is terminated.

In step S119, the input data acquisition unit 22 acquires input data from the input data database 52. At this time, the input data acquisition unit 22 acquires a document template and variable data that are necessary for the execution of software for reference. In this exemplary embodiment, a list of pieces of input data is displayed on the operation display unit 12f so that a user selects input data to be executed, thereby acquiring input data using an input data ID of the selected input data. However, a method of acquiring input data is not limited thereto, and predetermined input data may be acquired.

In step S121, the software execution unit 24 executes software for reference as a normal process to thereby generate output data based on the acquired input data as an execution result. For example, in a case where software for verification is software for image formation, the software execution unit 24 generates image data on the basis of the acquired document template and variable data, and sets the generated image data to be output data.

In step S123, the output data registration unit 26 determines whether or not the generated output data has not been registered. At this time, the output data registration unit 26 determines that registration has been completed in a case where pieces of output data in which a software name, a version, an apparatus name, setting information, and input data are all the same are registered in the output data database 54. In addition, the output data registration unit 26 determines that registration has not been completed with respect to piece of output data in which a software name, a version, an apparatus name, setting information, and input data are all the same are not registered in the output data database 54. In a case where it is determined that the output data generated in step S123 has not been registered (S123, Y), the flow proceeds to step S125. In a case where it is determined that the generated output data has not been unregistered (S123, N), the execution of the program of this registration process is terminated.

In step S125, the output data registration unit 26 stores the generated output data in the output data database 54 to thereby register the output data in the same manner as step S113.

In step S127, the output data registration unit 26 stores execution records of software for reference in the execution record database 56 to thereby register the execution records in the same manner as step S115, and the execution of the program of this registration process is terminated.

Figure 11:
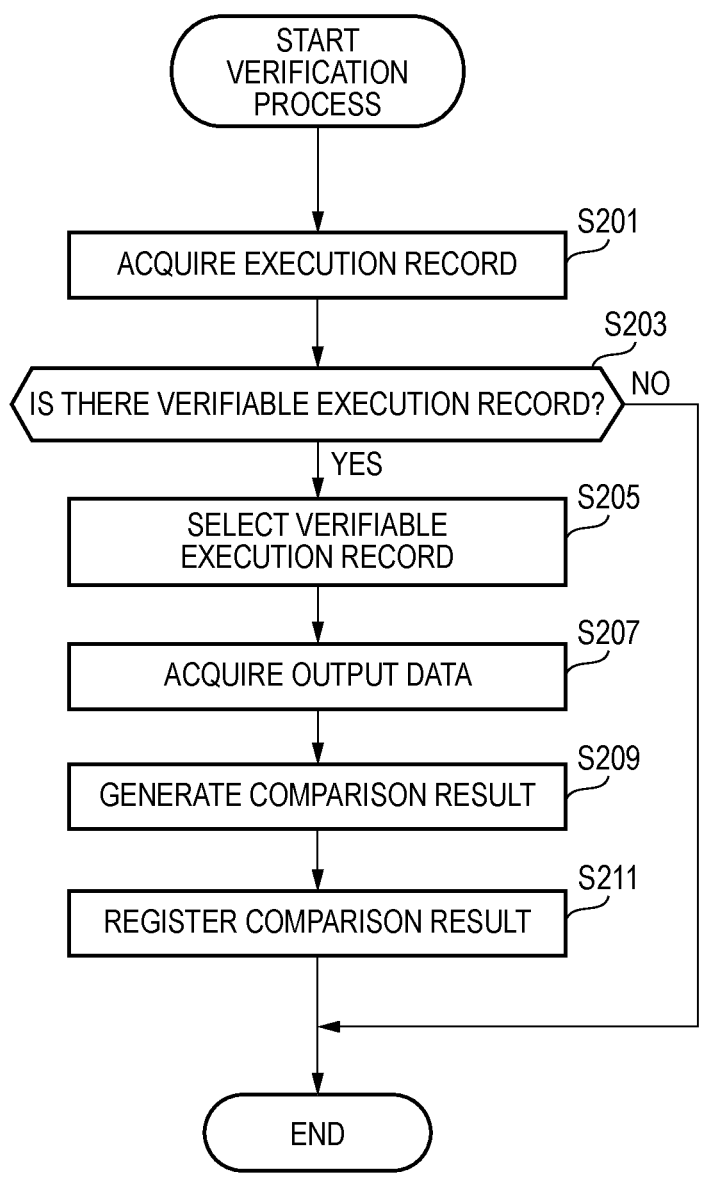
FIG. 11 is a flow chart showing a flow of a management process according to the exemplary embodiment.

Next, reference will be made to a flow chart shown in FIG. 11 to describe a flow of processing at the time of performing a verification process of verifying compatibility, which is executed by the management apparatus 30 according to this exemplary embodiment, by comparing a verification image and a reference image with each other.

Meanwhile, in this exemplary embodiment, a program of a verification process is stored in the storage unit 12d of the management apparatus 30 in advance, but the invention is not limited thereto. For example, the program of the verification process may be received from an external device through the communication line I/F unit 12e of the management apparatus 30. In addition, the program of the verification process which is recorded in a recording medium such as a CD-ROM may be read by a CD-ROM drive or the like, thereby executing the verification process.

In this exemplary embodiment, the program of the verification process is executed at a timing when an instruction for execution is input by the operation display unit 12f, but the invention is not limited thereto. The program of the verification process may be executed at a predetermined time (for example, 1:00 a.m.) or every time a predetermined time (for example, 12 hours) elapses.

In step S201, the output data acquisition unit 32 acquires execution records from the execution record database 56. In this exemplary embodiment, all of the execution records stored in the execution record database 56 are acquired, but the invention is not limited thereto. Some of the execution records stored in the execution record database 56 may be acquired. In this case, for example, a predetermined number of execution records among the execution records stored in the execution record database 56 may be acquired in order of the newest execution record.

In step S203, the comparison unit 34 determines whether or not a verifiable execution record is present among the acquired execution records. In this exemplary embodiment, in a case where there is output data which is newly added, the comparison unit 34 determines that a verifiable execution record is present. It is determined in step S203 that a verifiable execution record is present (S203, Y), the flow proceeds to step S205. In a case where it is determined that a verifiable execution record is not present (S203, N), the execution of the program of this verification process is terminated.

In step S205, the comparison unit 34 selects one verifiable execution record. In this exemplary embodiment, an execution record including unverified output data is selected.

In step S207, the comparison unit 34 acquires output data of a verification image on the basis of the selected execution record, and acquires output data of a reference image. In this exemplary embodiment, verified output data having the same reference software name and input data ID as those of the selected unverified output data is acquired as the output data of the reference image. At this time, even when there are plural pieces of input data having the same output result obtained, pieces of input data having different input data IDs are set to be different pieces of input data.

For example, a case where an execution record of an identifier "3001" of FIG. 5 is selected will be described. It is assumed that an image shown by output data having a software ID "0001" (a software name "Print-X" and a version "5.0") is set to be a reference image and an image shown by output by having a software ID "0002" (a software name "Print-X" and a version "5.1") is set to be a verification image. In this case, comparison is performed on plural pieces of output data, which are generated by different versions of the same software, by the same information processing apparatus.

Next, a case where an execution record of an identifier "3001" of FIG. 5 is selected will be described. It is assumed that an image shown by output data having a software ID "0001" (a software name "Print-X", a version "5.0", and an apparatus name "Host-A") is set to be a reference image and an image shown by output data having a software ID "0004" (a software name "Print-X", a version "5.0", and an apparatus name "Host-C") is set to be a verification image. In this case, comparison is performed on plural pieces of output data, which are generated by the same version of the same software, by different information processing apparatuses.

Figure 12A:
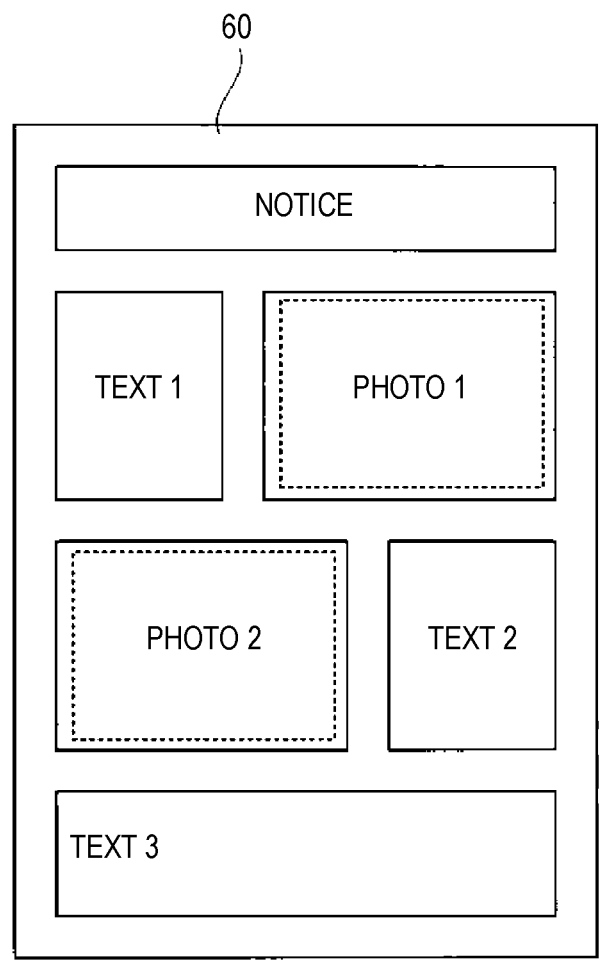
FIG. 12A is a schematic diagram showing an example of a verification image according to the exemplary embodiment.
Figure 12B:
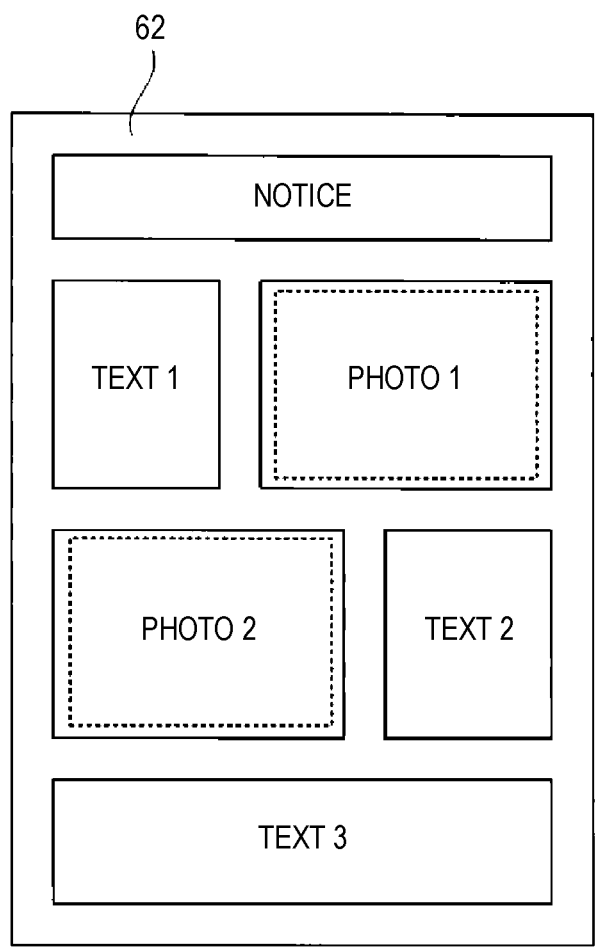
FIG. 12B is a schematic diagram showing an example of a reference image according to the exemplary embodiment.
Figure 13:
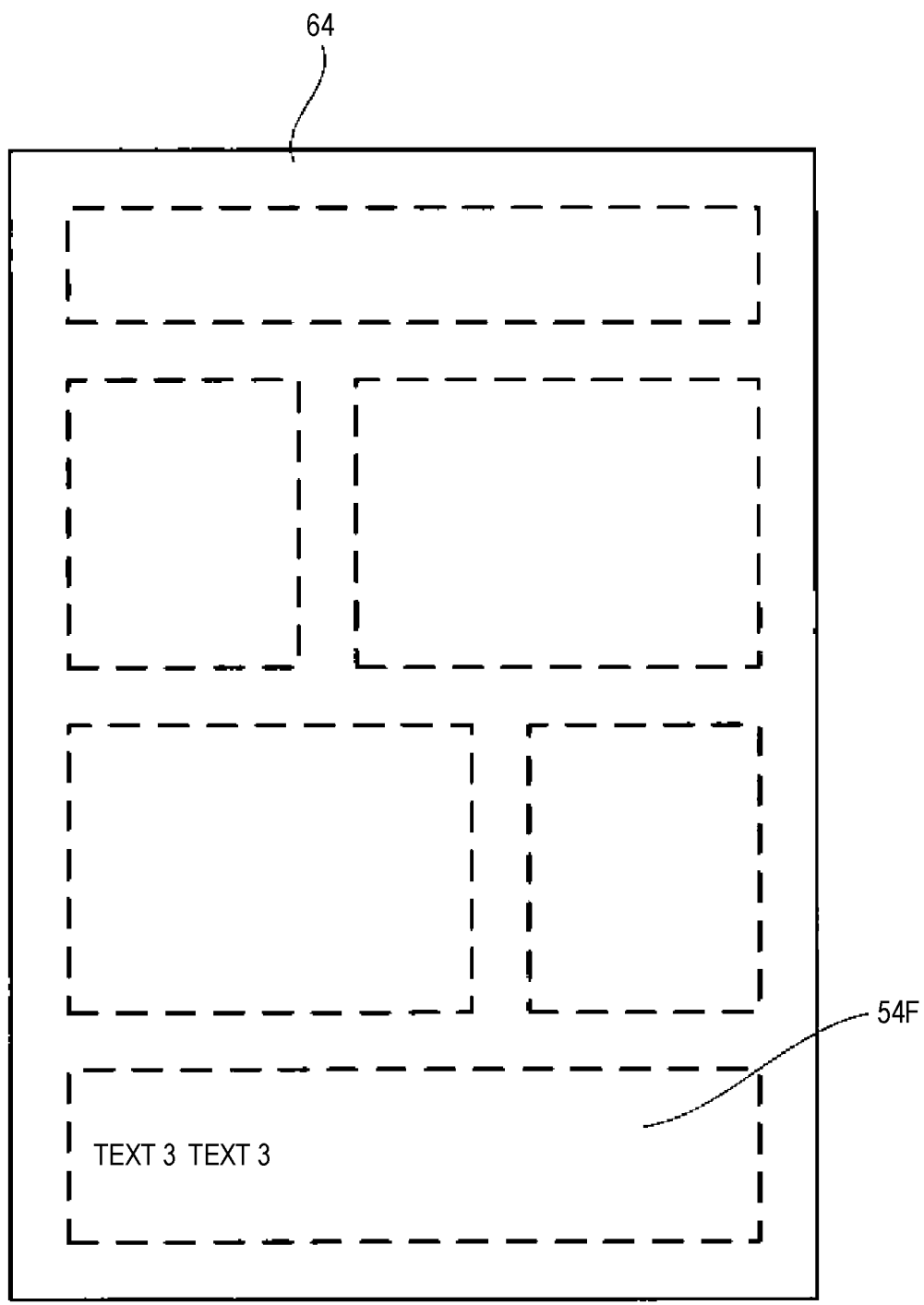
FIG. 13 is a schematic diagram showing an example of a difference image according to the exemplary embodiment.

In step S209, the comparison unit 34 compares a verification image and a reference image with each other to thereby generate a comparison result. In this exemplary embodiment, a verification image 60, as an example, which is shown in FIG. 12A and a reference image 62, as an example, which is shown in FIG. 12B are acquired, thereby generating a difference image 64 between the verification image 60 and the reference image 62 as shown in FIG. 13. In addition, the comparison unit 34 evaluates whether or not a difference falls within an acceptable range, from the generated difference image.

In this exemplary embodiment, a region in which a difference occurs between a verification image and a reference image is extracted. In addition, in a case where a maximum value of the length of a moving vector between the verification image and the reference image, with respect to a predetermined position within the region in the extracted region, is equal to or less than a predetermined threshold value, it is assumed that the difference falls within an acceptable range. However, a method of determining whether or not the difference falls within the acceptable range is not limited thereto. For example, in a case where an average value of the length of the moving vector is equal to or less than the predetermined threshold value, it may be assumed that the difference falls within the acceptable range. Alternatively, in a case where the number of pixels indicating that a difference occurs in the difference image between the verification image and the reference image is equal to or less than a threshold value, it may be assumed that the difference falls within the acceptable range. The comparison unit 34 generates verification results in which software for verification having a difference falling within an acceptable range is set to be compatible with software for reference and software for verification for which it is evaluated that a difference does not fall within an acceptable range is set to be incompatible with software for reference.

In step S211, the comparison result registration unit 36 stores the generated comparison result in the comparison result database 58, and the execution of the program of this verification process is terminated. In this exemplary embodiment, as shown in FIG. 6, the output data registration unit 26 attaches an output data ID of a reference image used for comparison as a reference data ID, and attaches an output data ID of a verification image used for comparison as a verification data ID. In addition, the output data registration unit 26 stores the reference data ID, the verification data ID, and a comparison result such as "compatibility" or "non-compatibility" in the comparison result database 58 in association with each other.

Meanwhile, in a case where software for verification is determined to be compatible with software for reference, the software for verification is verified and is used as software for reference from the next time.

Figure 14:
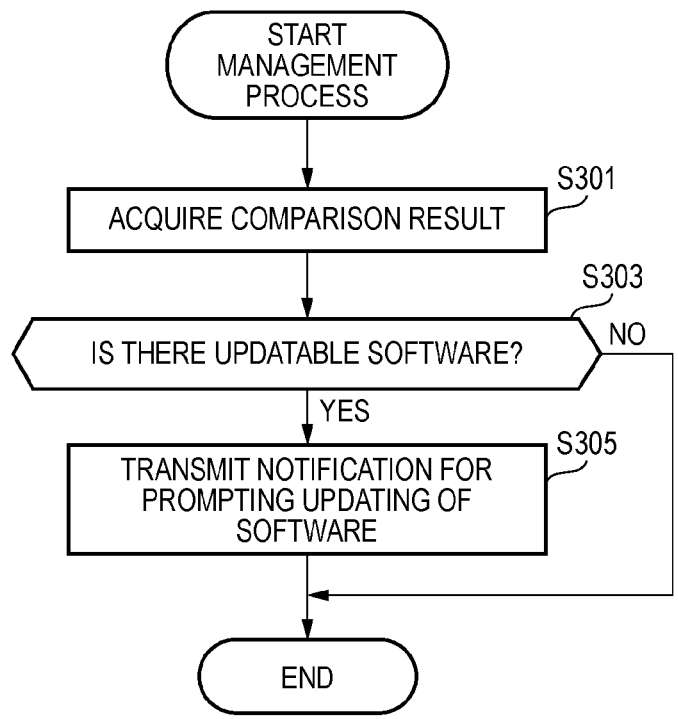
FIG. 14 is a flow chart showing a flow of a program of a management process according to the exemplary embodiment.

Next, reference will be made to a flow chart shown in FIG. 14 to describe a flow of processing at the time of performing a management process for prompting the updating of updatable software on the basis of a result of comparison between a verification image and a reference image which is performed by the management apparatus 30 according to this exemplary embodiment.

Meanwhile, in this exemplary embodiment, a program of a management process is stored in the storage unit 12d of the management apparatus 30 in advance, but the invention is not limited thereto. For example, the program of the management process may be received from an external device through the communication line I/F unit 12e of the management apparatus 30 and may be executed. In addition, the program of the management process which is recorded in a recording medium such as a CD-ROM may be read by a CD-ROM drive or the like, thereby executing the management process.

In this exemplary embodiment, a program of a management process is executed at a timing when an instruction for execution is input by the operation display unit 12f, but the invention is not limited thereto. The program of the management process may be executed at a predetermined time (for example, 1:00 a.m.) or every time a predetermined time (for example, 12 hours) elapses.

In step S301, the management unit 38 acquires a result of comparison between a verification image and a reference image from the comparison result database 58.

In step S303, the management unit 38 determines whether or not there is software for verification for which it is determined that compatibility is present in the comparison result, that is, whether or not there is updatable software. In a case where it is determined in step S303 that there is updatable software (S303, Y), the flow proceeds to step S305. In a case where it is determined that there is no updatable software (S303, N), the execution of the program of this management process is terminated.

In step S305, an updating notification for prompting the updating of updatable software is transmitted to the information processing apparatus 20 having generated a verification image, and the execution of the program of this management process is terminated. The information processing apparatus 20 having received an updating apparatus updates the version of software prompted to be updated.

Meanwhile, the information processing apparatus 20 may confirm a comparison result stored in the comparison result database 58 to perform an updating process of updating updatable software in a case where the updatable software is present.

Figure 15:
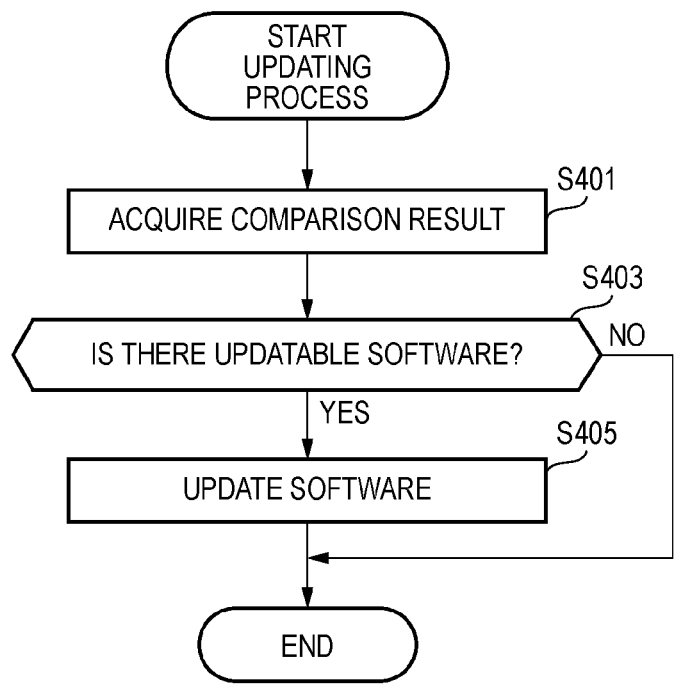
FIG. 15 is a flow chart showing a flow of a program of an updating process according to the exemplary embodiment.

Reference will be made to a flow chart shown in FIG. 15 to describe a flow of processing at the time of performing an updating process of updating updatable software which is performed by the information processing apparatus 20 according to this exemplary embodiment.

Meanwhile, in this exemplary embodiment, a program of an updating process is stored in the storage unit 12d of the information processing apparatus 20 in advance, but the invention is not limited thereto. For example, the program of the updating process may be received from an external device through the communication line I/F unit 12e of the information processing apparatus 20 and may be executed. In addition, the program of the updating process which is recorded in a recording medium such as a CD-ROM may be read by a CD-ROM drive or the like, thereby executing the updating process.

In this exemplary embodiment, a program of an updating process is executed at a timing when an instruction for execution is input by the operation display unit 12f, but the invention is not limited thereto. The program of the updating process may be executed at a predetermined time (for example, 1:00 a.m.) or every time a predetermined time (for example, 12 hours) elapses.

In step S401, the updating unit 28 acquires a result of comparison between a verification image and a reference image from the comparison result database 58.

In step S403, the updating unit 28 determines whether or not there is a verification image and a reference image that are determined to have compatibility in the comparison result, that is, whether or not there is updatable software with respect to pieces of software that are installed in the information processing apparatus 20 in which the updating unit is included. In a case where it is determined in step S403 that there is updatable software (S403, Y), the process proceeds to step S405. In a case where it is determined that there is no updatable software (S403, N), the execution of the program of this updating process is terminated.

In step S405, the version of the updatable software is updated, and the execution of the program of this updating process is terminated.

Meanwhile, the registration process of the information processing apparatus 20 may be performed during work, and the verification process of the management apparatus 30 may be performed off work (for example, at night). In this case, output data generated on the basis of input data used for work is stored in the output data database 54.

In addition, in this exemplary embodiment, a case where a document template and variable data are used as input data has been described, but the input data may be any image data.

In addition, in this exemplary embodiment, a case where software for verification or software for reference are selected in steps S103 and S105 has been described, but the invention is not limited thereto. For example, in an information processing apparatus newly installed, software for verification may be selected by omitting steps S103 and S105.

In addition, in this exemplary embodiment, a case where an image shown by output data stored in the output data database 54 is set to be a reference image has been described, but the invention is not limited thereto. For example, an image may be formed by software for reference during the verification of compatibility, and the formed image may be used as a reference image.

In addition, in this exemplary embodiment, a case where output data is created by software for image formation has been described, but the invention is not limited thereto. Output data may be created by software (browser) for creating a Web screen.

In addition, in this exemplary embodiment, a case where management is performed using information indicating "compatibility" or information indicating "non-compatibility" with respect to a verification result has been described, but the invention is not limited thereto.

More detailed information may be managed as a verification result. The more detailed information may be, for example, property information including at least one of a page size, the number of pages, positions of a margin and a trim, and a font of an image determined to have no compatibility. Alternatively, the detailed information may be a position in which a difference occurs between a verification image and a reference image, a drawing object in which a difference occurs, or the like.

In addition, in this exemplary embodiment, a description has been given of a case where the management apparatus 30 compares compatibilities of pieces of software stored in the respective plural information processing apparatuses 20 with each other and generates verification results of the comparison, but a management subject is not limited thereto. For example, the information processing apparatus 20 may generate a verification image, may acquire a reference image, may compare the generated verification image with the acquired reference image with each other, and may generate a verification result of the comparison.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A management apparatus comprising:
a processor programmed to
acquire a verification image generated from predetermined image data by a first software for verification in a target information processing apparatus that stores the first software for verification, and a reference image generated from the predetermined image data by a second software having a verification result indicating compatibility;
extract a region in which a difference between the verification image and the reference image occurs; and
manage a verification result indicating
that the first software for verification has compatibility in a case where a maximum value or an average value of a length of a moving vector of the extracted region between the verification image and the reference image, or a number of pixels of the extracted region, is equal to or less than a predetermined threshold value, and
that the first software for verification has no compatibility in a case where the maximum value or the average value of the length of the moving vector, or the number of pixels, is larger than the predetermined threshold value.

2. The management apparatus according to claim 1, wherein the reference image is an image generated by the second software having the verification result indicating compatibility, which is stored in the target information processing apparatus, or an image generated by the second software having the verification result indicating compatibility, which is stored in an information processing apparatus different from the target information processing apparatus.

3. The management apparatus according to claim 1, wherein the reference image is an image generated using setting information regarding image formation used at a time of generating the verification image.

4. The management apparatus according to claim 3, wherein the setting information includes at least one of information indicating a font list used for image formation, information indicating resolution of an image formed, and information indicating whether an image formed is a monochromatic image or a color image.

5. The management apparatus according to claim 1, wherein the first software for verification and the second software having the verification result indicating compatibility are the same version of software having the same contents.

6. The management apparatus according to claim 1, wherein the first software for verification and the second software having the verification result indicating compatibility are different versions of software having the same contents.

7. The management apparatus according to claim 6, wherein the reference image is an image generated by the target information processing apparatus.

8. The management apparatus according to claim 1, further comprising:
a memory that stores an image generated by the second software having the verification result indicating compatibility,
wherein the processor is further programmed to use the image stored in the memory as the reference image.

9. The management apparatus according to claim 1, wherein the processor is further programmed to transmit updating instruction information for prompting updating to the first software determined to have compatibility.

10. A management method comprising:
acquiring a verification image generated from predetermined image data by a first software for verification in a target information processing apparatus that stores the first software for verification, and a reference image generated from the predetermined image data by a second software having a verification result indicating compatibility;

extracting a region in which a difference between the verification image and the reference image occurs; and managing a verification result indicating that the first software for verification has compatibility in a case where a maximum value or an average value of a length of a moving vector of the extracted region between the verification image and the reference image, or a number of pixels of the extracted region, is equal to or less than a predetermined threshold value, and that the first software for verification has no compatibility in a case where the maximum value or the average value of the length of the moving vector, or the number of pixels, is larger than the predetermined threshold value.

11. A non-transitory computer readable medium storing a program causing a computer to execute a management process, the process comprising:

acquiring a verification image generated from predetermined image data by a first software for verification in a target information processing apparatus that stores the first software for verification, and a reference image generated from the predetermined image data by a second software having a verification result indicating compatibility;

extracting a region in which a difference between the verification image and the reference image occurs; and managing a verification result indicating that the first software for verification has compatibility in a case where a maximum value or an average value of a length of a moving vector of the extracted region between the verification image and the reference image, or a number of pixels of the extracted region, is equal to or less than a predetermined threshold value, and that the first software for verification has no compatibility in a case where the maximum value or the average value of the length of the moving vector, or the number of pixels, is larger than the predetermined threshold value.

* * * * *